US005488198A

United States Patent [19]
Kramer

[11] Patent Number: 5,488,198
[45] Date of Patent: Jan. 30, 1996

[54] PROTECTION DEVICE FOR APERTURES IN METAL STUDS OR PANELS

[76] Inventor: Hy Kramer, 50 Carter Dr., Stamford, Conn. 06902

[21] Appl. No.: 299,590

[22] Filed: Sep. 1, 1994

[51] Int. Cl.⁶ .................................................. H02G 3/26
[52] U.S. Cl. .................... 174/48; 174/153 G; 248/56; 16/2
[58] Field of Search ..................... 174/48, 65 G, 174/152 G, 153 G; 248/56; 16/2

[56] References Cited

U.S. PATENT DOCUMENTS

| | | | |
|---|---|---|---|
| 1,217,537 | 6/1917 | Hunter | 24/72.5 |
| 3,057,001 | 10/1962 | Rapata | 16/2 |
| 3,372,441 | 3/1968 | Fisher | 174/153 G X |
| 3,372,960 | 3/1968 | Fisher | 174/153 G X |
| 4,050,205 | 9/1977 | Ligda | 174/48 X |
| 4,289,924 | 9/1981 | Pearce, Jr. | 174/152 G |
| 4,588,853 | 5/1986 | Confer | 174/48 |
| 4,860,791 | 8/1989 | Putnam | 248/56 X |

Primary Examiner—Kristine L. Kincaid
Assistant Examiner—David A. Tone
Attorney, Agent, or Firm—Hy Kramer

[57] ABSTRACT

The present invention relates to a new device for protecting wires and tubes that must be placed thru the apertures in building panels or studs made of steel or the like. The protection device disclosed herein includes a single piece, plastic body having a wall surface which is bowed on opposing sides and flanged along its periphery. On opposing sides of the outer surface of the body's wall is arranged a single protruding ridge or a plurality of protruding, angled pins or male nubs which securely hold, in the gap formed between the wall flange and the ridge/male nubs, the opposing rims of an aperture in a metal stud that this device is designed to be securely attached to. The body of this device can be of any size or shape, including but not limited to square, rectangular, oval or cathedral shaped. Due to its elasticity and larger than aperture size, this device can be pinched in along the opposing bowed sides of the body's wall and upon release an outward pressure is achieved against the rims of the stud aperture. The design of the protruding male nubs in relation to the wall flange allows this device to remain firmly attached to the aperture once it is attached thereto.

5 Claims, 1 Drawing Sheet

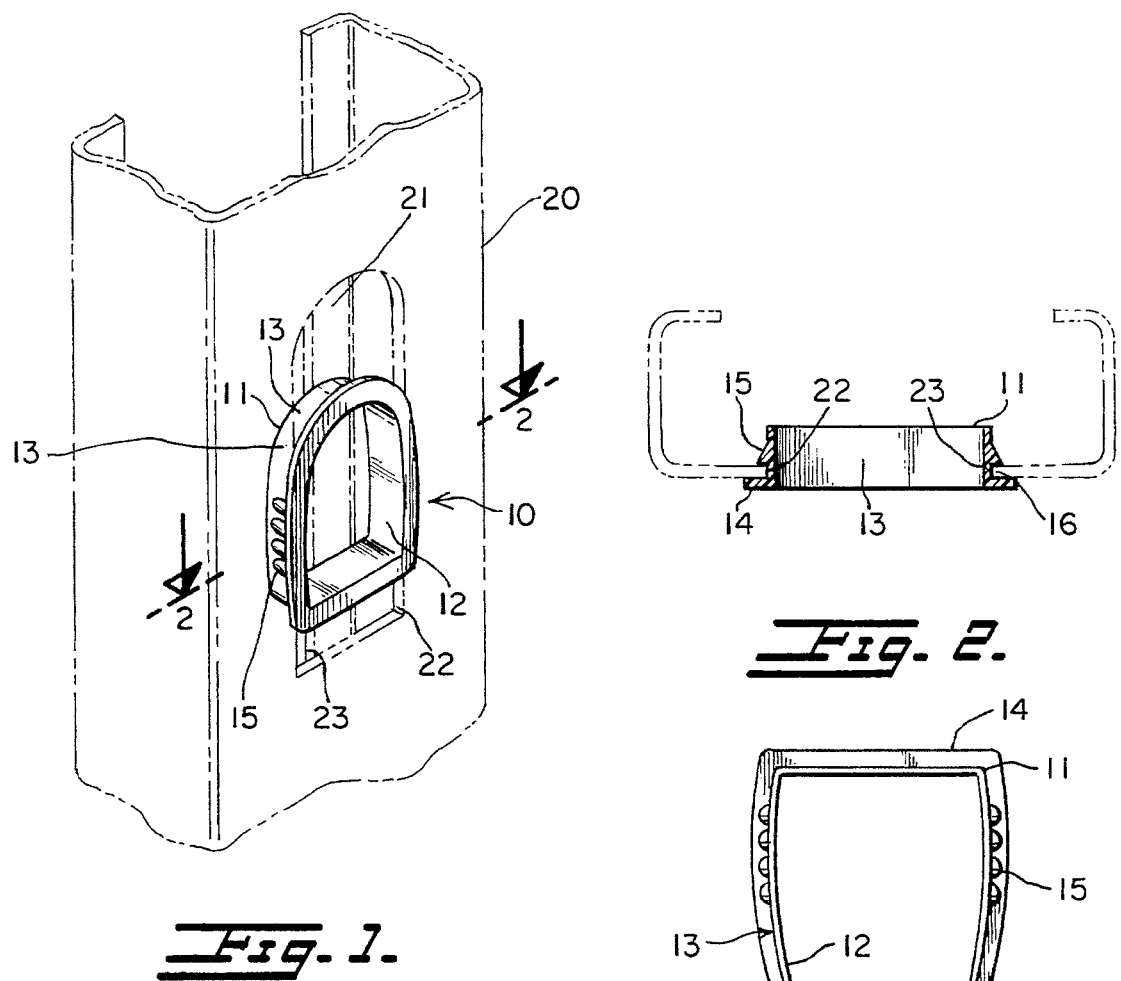
Fig. 1.
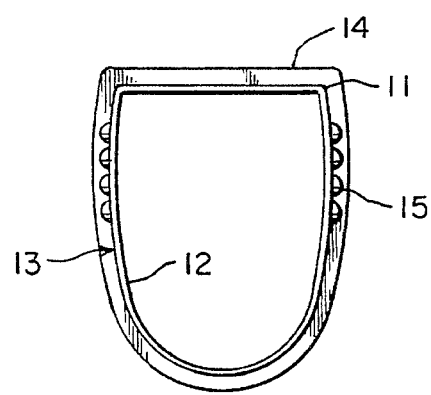
Fig. 2.
Fig. 3.
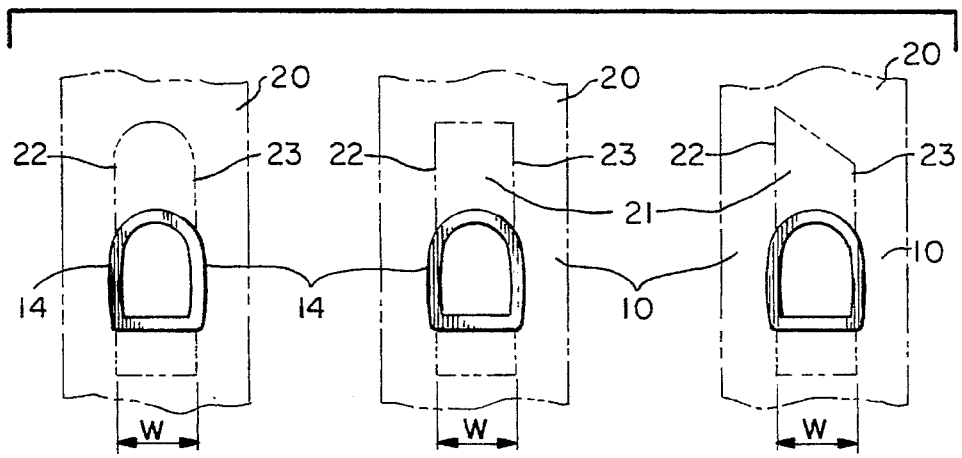
Fig. 4.

PROTECTION DEVICE FOR APERTURES IN METAL STUDS OR PANELS

FIELD AND BACKGROUND OF THE INVENTION

The present invention generally relates to a new protector for apertures or openings in studs or panels. More specifically, the present disclosure is to a single piece, cathedral shaped, plastic device which is flexible and is designed so it can be easily attached to an apertured stud made of steel or the like.

There are presently generally known various protective devices but they all present various inconveniences and setbacks which are overcome by the simple and inexpensive device disclosed herein.

Illustrative prior art includes U.S. Pat. No. 3,057,001 which discloses a Strain Relief Grommet. The grommet is attached to an apertured panel by inserting a shank portion into the panel aperture and engaging the backside of the panel by shoulders on the shank portion. At least one of the shoulders which engages the backside of the panel is on a flexible finger which is collapsed and then expanded as the shank portion is inserted into the panel aperture. Another prior patent, U.S. Pat. No. 4,289,924 discloses a hard plastic grommet made of two hard plastic shells which are arranged around a bundle of cables and which must additionally be injected with a sealant. Finally, in U.S. Pat. No. 5,117,537, is disclosed a clip device for being removably secured to a marginal edge portion of a sheet of flexible material. Unlike the above devices, the present device is a single, easily molded piece, which can be attached to a panel aperture without the use of sealants or other costly attaching means.

OBJECTS OF THE INVENTION

The object of this invention is to provide a flexible, single piece, device for protecting wires and tubes placed thru apertures in building panels or studs which has a convenient and easy to use design.

A further object of the present invention is to provide a aperture protection device which is made of flexible plastic for use on apertured studs of panels made of steel or the like.

Another object of the present invention is to provide a aperture protection device having a flanged perimeter and one or more protruding, angled pins or nubs for securely holding therebetween the rim of the aperture in the metal panel or stud it attaches to without the use of sealants.

A still further object of the invention is to provide a aperture protection device that can be pinched in so as to conveniently fit in most apertured steel panels or studs.

Other objects and features of the invention will become apparent to those skilled in the art from the following detailed description of the preferred embodiment of the invention as illustrated in the accompanying sheet of drawings wherein like reference numbers identify like parts throughout:

BRIEF DESCRIPTION OF THE DRAWINGS

The present invention will now be described with reference to the accompanying drawings, in which:

FIG. 1 is a side isometric view showing the aperture protection device of this invention attached to the aperture of a stud or panel.

FIG. 2 is a view taken through 2—2 of FIG. 1 showing the aperture protection device receiving in the gap between its protruding nubs and its flange the opposing rims of the aperture in the stud or panel.

FIG. 3 is a rear perspective view of the aperture protection device of this invention.

FIG. 4 is a front perspective view of the aperture protection device as it is attached within three different shaped apertures of studs or panels all having a width (W). Other shaped apertures can be considered.

DESCRIPTION OF THE DEVICE IN A PREFERRED EMBODIMENT

Referring now to the drawings and more particularly to FIG. 1 in which is shown the protection device, in a side isometric view, attached to the opposing rims of the aperture in a metal stud or panel 20 (not part of this invention). The protection device, which will eliminate damage to wires and tubes that must be placed thru apertures 21 in metal building panels 20, comprises a body 10 defined by a wall 11 having inner 12 and outer 13 wall surfaces. Said body's 10 wall 11 is bowed on its opposing sides and is flanged along its periphery. In the embodiment shown in this application, the body 10 is a single piece, plastic body having a cathedral shape. In other embodiments, not shown herein, the body 10 of this device can be square, oval or rectangular in shape. Due to its elasticity and larger than aperture size, this device can be pinched in along the opposing bowed sides of the body's wall 11 (see FIG. 3) and upon release an outward pressure is achieved against the rims 22 and 23 of the stud aperture 21.

A flange 14 is formed around the periphery of said wall 11. As can be seen in FIGS. 1, 2 and 3, four male nubs 15 protrude from each of the opposing sides of the outer wall surface 13 of said body 10 so as to face said flange 14, at a predetermined distance, thereby defining a gap 16 between said nubs 15 and said flange 14 for receiving, therebetween, the opposing rims 22 and 23 of the aperture 21 in the metal stud 20. As they protrude from the outer wall surface 13, the nubs 15 are angled toward the flange 14 so as to form an angle of less than 90 degrees at the point of intersection with outer wall surface 13. This particular structure allows for the protection device to be firmly attached to the opposing rims 22 and 23 of an aperture in metal stud 20. Although the protection device shown in the drawings herein has four male nubs 15 protruding from each of the opposing sides of the outer wall surface 13 of said body 10, a single ridge like structure or two or more male nubs can be used depending on the exact size and dimensions of the manufactured protection device. FIG. 4 is a front perspective view of the protection device, having a cathedrally shaped body, ie. the body is of the configuration having two opposing straight sides which converge at one end to form a semi-circle, as it is attached within three different shaped apertures of studs or panels having the width marked (W). The body 10 of this protection device can have any other shape as long as it is larger than the particular stud aperture it is to attach to by way of the simple pinching in of the opposing sides of the body's wall 11 and upon release an outward pressure is achieved against the rims 22 and 23 of the stud aperture 21. The design and angle of the single ridge like structure or plurality of protruding male nubs 15 in relation to the wall flange 14 allows this device to remain firmly attached to the aperture 21 once it is attached thereto.

Although simple in design and inexpensive to manufacture, there is no prior art which anticipates or makes obvious the present flexible plastic, single piece, protection device. This convenient and inexpensive device will protect wires and tubes, placed thru apertures in building panels or studs made of metal or the like, from damage and costly replacement.

Since the invention is described and illustrated with reference to but a single preferred embodiment, and since numerous modifications and changes may become readily apparent to those skilled in the art after reading this disclosure, it should be understood that I do not wish to limit the scope of my invention to the exact construction shown and described above, and as claimed by me below.

What is claimed by me is:

1. A protection device for wires and tubes which is attached along the opposing rims of an aperture in metal studs or the like comprising:

a body made of a flexible plastic material defined by a wall having opposing sides and having an inner and outer wall surface said opposing sides being bowed outwardly so that the device can be pinched into attachment with the opposing rims of an aperture in a metal stud;

a flange, said flange is formed around the periphery of said wall;

one or more male nubs protrude from each of the opposing sides of the outer wall surface of said body at an angle of less than 90 degrees, in the gap facing the flange, thereby defining a gap between said nubs and said flange for receiving, therebetween, the opposing rims of the aperture in a metal stud.

2. Device in accordance with claim 1 wherein the body is square shaped.

3. Device in accordance with claim 1 wherein the body is rectangular shaped.

4. Device in accordance with claim 1 wherein the body is of the configuration having two opposing straight sides which converge at one end to form a semi-circle.

5. Device in accordance with claim 1 wherein the body is oval shaped.

* * * * *